April 30, 1929.   F. G. PURINTON   1,711,250
PROCESS AND APPARATUS FOR ASSEMBLING ARTICLES FOR TREATMENT
Original Filed Oct. 24, 1925   3 Sheets-Sheet 1

Inventor.
Forrest G. Purinton
by Heard Smith & Tennant.
Attys.

April 30, 1929. F. G. PURINTON 1,711,250
PROCESS AND APPARATUS FOR ASSEMBLING ARTICLES FOR TREATMENT
Original Filed Oct. 24, 1925  3 Sheets-Sheet 2

Inventor
Forrest G. Purinton
by Heard Smith & Tennant
Attys.

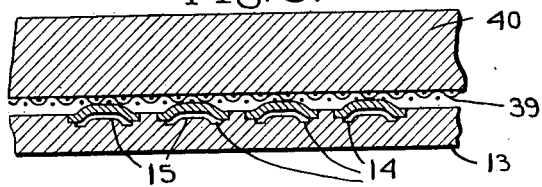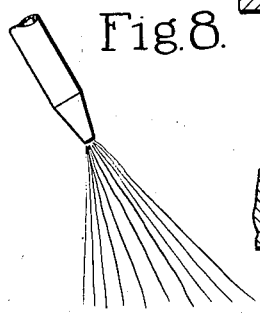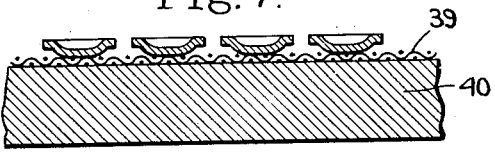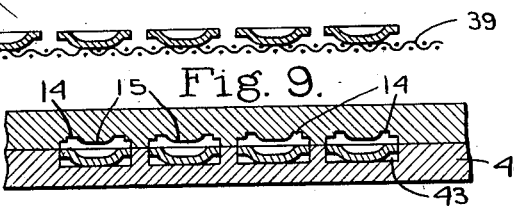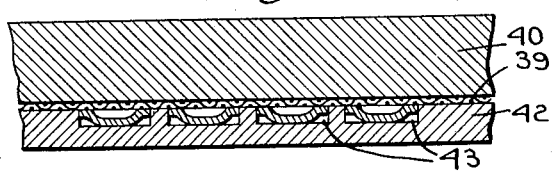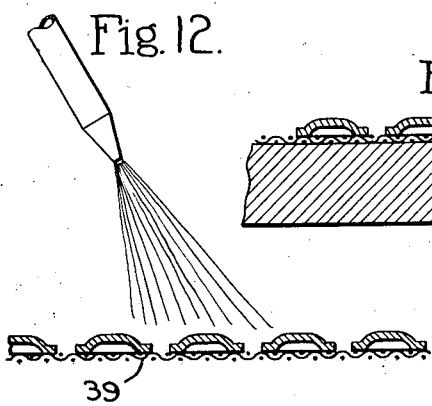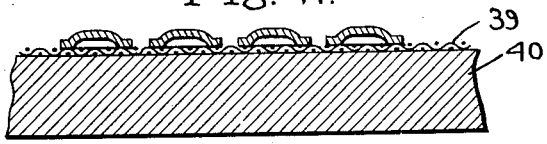

Patented Apr. 30, 1929.

1,711,250

UNITED STATES PATENT OFFICE.

FORREST G. PURINTON, OF WATERBURY, CONNECTICUT, ASSIGNOR TO THE PATENT BUTTON COMPANY, OF WATERBURY, CONNECTICUT, A CORPORATION OF CONNECTICUT.

PROCESS AND APPARATUS FOR ASSEMBLING ARTICLES FOR TREATMENT.

Application filed October 24, 1925, Serial No. 64,675. Renewed September 29, 1928.

This invention relates to a process and apparatus for assembling articles for treatment. More particularly the invention relates to method and apparatus for assembling small articles, such as buttons, for air brush painting, and the object thereof is to provide an apparatus for selecting articles from a mass and positioning them in separated, but closely related juxtaposition, with like faces of the articles presented to view for painting or such other treatment as may be desired.

A further object of the invention is to provide means for assembling articles in the manner described and also providing means by which the articles may be transferred to a supporting means which will permit the air from an air brush to blow through without displacing the buttons and which will not readily accumulate paint or other material which is not deposited upon the exposed faces of the articles.

A further object of the invention is to provide an apparatus in which the articles may be assembled and thereafter reversed to expose the opposite faces of the article for treatment, such as air brush painting.

Another object of the invention is to provide a machine for assembling articles which will automatically select the articles from a mass thereof which is caused progressively to pass over the assembling device and which preferably is so constructed as rapidly to discharge the articles after the assembling device has been filled.

Other objects and features of the invention will more fully appear from the following description and the accompanying drawings and will be particularly pointed out in the claims.

A preferred form of apparatus for performing the process above described is illustrated in the accompanying drawings, in which, Fig. 1 is a vertical longitudinal sectional view of an article-assembling machine;

Fig. 5 is a detail sectional view of a portion of the preferred form of assembling tray with a button properly seated in the recess thereof and another reversely positioned button about to be discharged from the recess;

Fig. 6 is a detail sectional view illustrating the assembling tray with a series of buttons properly seated therein with a screen and backing-board superimposed thereupon;

Fig. 7 is a detail sectional view showing the screen and backing-board supporting the buttons in position for painting and other treatment, the assembling tray having been removed;

Fig. 8 is a detail sectional view illustrating the buttons in painting position with paint being sprayed thereupon by an air brush;

Fig. 9 is a detail sectional view showing the buttons properly positioned in the recesses of the assembling tray, with the reversing tray superimposed thereupon;

Fig. 10 is a detail sectional view showing the reversing tray with the screen and backing-board applied thereto;

Fig. 11 is a detail sectional view of the buttons supported upon the screen, with the backing-board therebeneath, the reverse faces of the buttons being presented for treatment;

Fig. 12 is a detail sectional view showing the reverse faces of the buttons being painted with an air brush; and, Fig. 13 (Sheet 1) is a vertical sectional view of another form of assembling mechanism.

The invention relates more particularly to the method and apparatus for rapidly assembling a large number of small articles, such as buttons, for painting by an air brush.

The present invention comprises assembling the buttons, or other articles, upon a suitable assembling tray having means to receive and retain the articles with like faces exposed, then transferring the buttons, or other articles, to a screen or other device which will permit the air from the air brush to blow through without being so deflected as to displace any of the assembled buttons and which will not readily accumulate the paint which is not deposited on the buttons. Thus like faces of the buttons, or other article, may be coated with substantial uniformity.

The method further comprises reassembling the buttons, or other articles, in like manner, then reversing the articles to expose the opposite faces, then transferring the reversed articles by inversion to a suitable screen and spraying the articles with an air brush in the manner above described so that the reversed faces of the articles will also be painted, or otherwise coated with substantial uniformity.

In performing the steps of the process above described suitable automatic apparatus desirably is employed comprising an assembling tray having means, such as recesses, adapted to selectively receive and retain only such articles, from a mass of articles deposited upon the tray, as rest upon the tray in a predetermined position, improperly positioned and surplus articles being discharged from the tray. A screen is superimposed upon the tray when it has been substantially filled with properly positioned articles, the tray and screen, preferably with the backing-board for the screen, being then reversed so that the articles will be deposited from the tray upon the screen. The assembling tray is then removed leaving the articles upon the screen, whereupon the screen can be readily removed from its backing-board and the buttons, or other articles, sprayed with an air brush without the accumulation of surplus paint upon the articles, as the finely divided paint from the air brush will readily pass through the screen into a suitable receptacle therebeneath where it can be retrieved.

Figure 1:
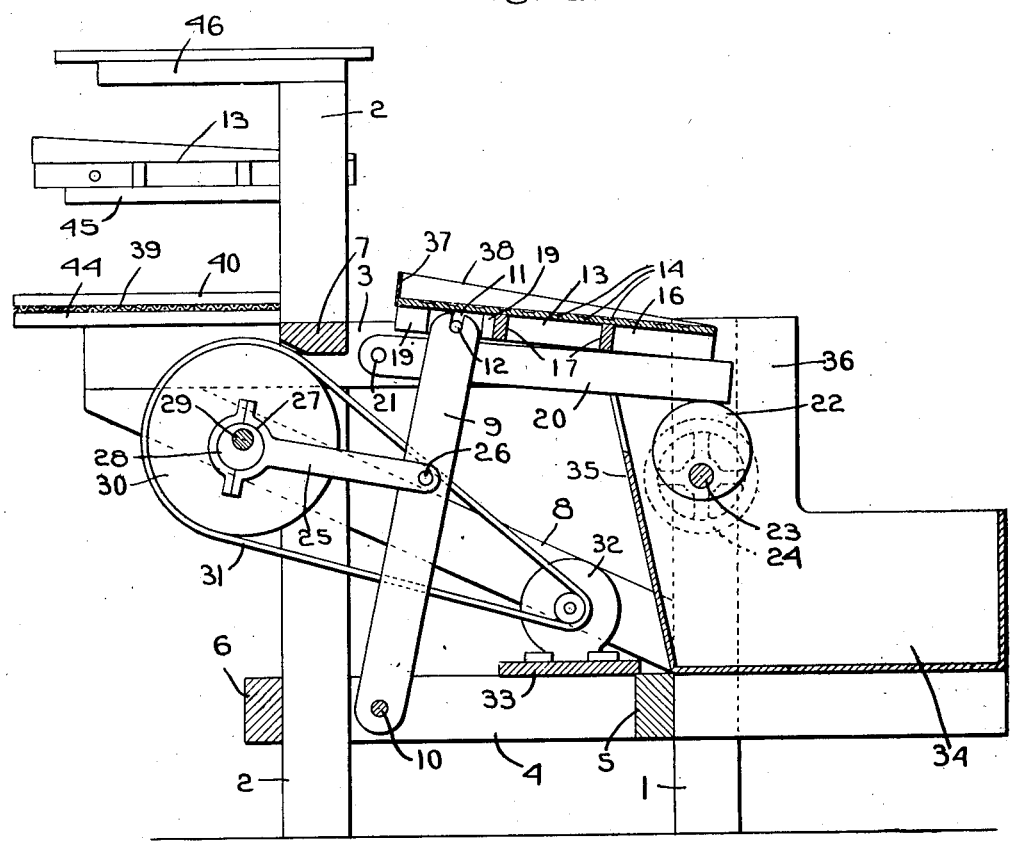
Figure 2:
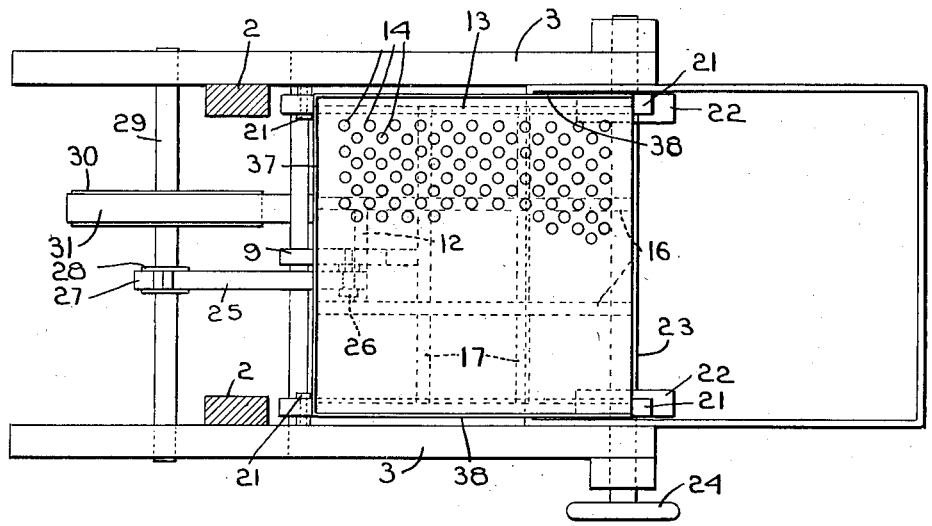
Fig. 2 is a plan view of a machine, a portion of the standards being shown in section, and supporting shelves omitted.

The preferred form of machine or apparatus for performing the above mentioned steps in the process illustrated in the accompanying drawings comprises a substantially rectangular frame having vertical front posts 1 and rear posts 2 connected by upper and lower side bars 3 and 4 and cross girders 5, 6 and 7, the rear post 2 desirably extending some distance above the side bars 3 and 4. The term "front" is used herein to designate the right hand end of the machine as illustrated in Figs. 1 and 2 as the operator of the machine stands adjacent this end of the machine. Desirably braces 8 extend diagonally from the lower portions of the front posts 1 to the upper side bars 3 and are secured both to the posts 1 and 2 and to the upper side bars 3.

A vertical arm or lever 9 is pivotally mounted upon a shaft 10 which is secured at its ends to, or journalled in, the lower side bars 4. The upper end of the arm or lever 9 is provided with an open recess 11 which detachably receives a rod or bar 12 in the central lower portion of the assembling tray 13. The assembling tray 13 desirably comprises a flat plate of hard rubber or other suitable material, the upper surface of which is counterbored with staggered series of shallow counterbored recesses 14 arranged in as close juxtaposition as is found desirable, these shallow recesses being slightly larger in diameter than the buttons or other articles which are to be assembled, and of a depth which will receive the articles when resting therein in a predetermined position, but which will not allow articles resting in the recesses in any other position to be caught.

In the construction illustrated the trays are adapted to assemble buttons of usual character in which the central portion of the face of the button is concave and the rear face of the button correspondingly convex. In such cases the bases of the recesses 14 desirably are provided with projections 15 which will raise the edge of the button sufficiently to cause a button which has dropped into the recess with its lower face downward to extend above the flat surface of the tray so that a button in such position will readily pass out of the recess, whereas a button positioned with its face down in the recess will be retained therein as illustrated more particularly in Fig. 5.

Figure 3:
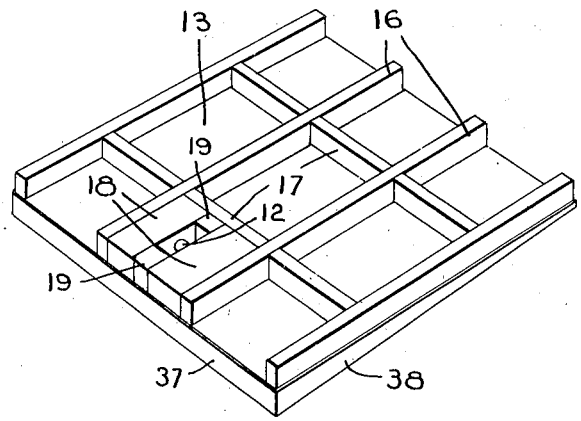
Fig. 3 is a perspective view showing the under face of the assembling tray.
Figure 4:
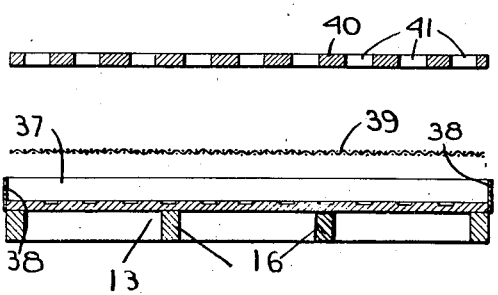
Fig. 4 is a longitudinal sectional view of the assembling tray and illustrating superimposed thereover the screen and backing-board therefor.

The tray 13, which is illustrated in inverted position in Fig. 3, desirably is provided with a re-enforcing frame comprising a series of longitudinally extending bars or girders 16, and transverse girders 17, the rod 12 being mounted at its ends in filling blocks 18 secured between the intermediate girders 16 and abutting against the rearmost of the transverse girders 17. Other filling blocks 19 are inserted between the filling blocks 18, but are spaced apart a sufficient distance to permit free movement of the upper end of the arm 9 when the rear end of the tray is supported thereupon as illustrated in Fig. 1.

The forward end of the tray desirably is slidably supported in such a manner that it may be readily adjusted vertically to permit the tray to be tilted downwardly during its reciprocating movement for the purpose of more rapidly discharging the surplus articles which are placed upon the tray.

The preferred means for slidably supporting the rearward end of the tray, as illustrated herein, comprises a pair of guides 20 pivoted respectively upon studs 21 mounted in the upper side bars 3 of the frame. The forward ends of these guide bars rest upon the peripheries of eccentrics or cams 22 which are secured to a transverse shaft 23 which is journalled in the front posts 1 of the frame and is provided with a hand wheel 24 by means of which the shaft and the eccentrics thereupon may be rotated to adjust the height of the forward end of the tray. The arm or lever 9 is oscillated about its pivot 10 to impart a longitudinal reciprocating movement to the tray and in view of the fact that the rear end of the tray is carried by the upper end of the arm or lever 9 it is given a combined longitudinal and vertical movement corresponding to the height of the arc through which the upper end of the arm swings, that is, a slight tossing movement.

Any suitable means may be provided for oscillating the arm or lever 9. As illustrated herein the arm or lever 9 is actuated through a link 25 which is pivotally connected at its forward end to the arm 9 by a stud 26 and at its rear end is provided with a cylindrical journal 27 which fits an eccentric 28 mounted upon a driving shaft 29 which is journalled in suitable bearings in the braces 8 of the frame.

Any suitable means may be provided for actuating the driving shaft 27. As shown in the accompanying drawings the shaft 27 has rigidly affixed to it a pulley 30 which is driven by a belt 31 from an electric motor 32 which is carried by a stand 33 mounted upon the lower side bars 4 of the frame. An electric switch for controlling the motor (not shown) may be located in any position convenient to the operator who stands at the front or right hand end of the machine.

A rectangular hopper 34 of box-like construction, having an extended inclined rear wall 35 and extended side wall sections 36, serves to receive the surplus articles which are delivered from the assembling tray.

The assembling tray is provided with an upwardly extending rear flange 37 and side flanges 38 which desirably taper downwardly toward the forward end of the tray. These flanges serve to prevent the articles deposited upon the tray from spilling over the rear end and sides thereof, and also form guides for the screen and its backing-board and also for the reversing tray which is employed in connection with the assembling tray.

The screen which is employed to receive the articles from the tray may be formed in any desired manner. Preferably it is in the form of a rectangular reticulated screen 39 of relatively heavy wire and large mesh and of a size to fit easily within the flanges 37 and 38 of the assembling tray. Desirably, but not necessarily, a backing-board 40 is provided to re-enforce the wire screen and prevent it from flexing during the inversion of the tray and screen to transfer the articles from the assembling tray to the screen. The backing-board 40 may be provided with perforations 41 of any desired size to lighten it without unduly weakening it.

In the operation of the machine a mass of articles is dumped into the hopper 34. A large scoopfull of the articles is dipped from the mass by the operator and placed upon the rear portion of the assembling tray. The electric motor is then started and the assembling tray oscillated in the manner aforesaid, the rear end of the tray being given a slight tossing motion, while the forward end of the tray is given a sliding motion. This reciprocation causes an agitation of the mass of articles upon the tray and such articles as are properly positioned upon the tray pass into the recesses therein and are retained, while improperly positioned articles which drop into the recesses slide out of the recesses and are either turned over and find resting places in other recesses or are discharged from the forward end of the tray. The reciprocation of the tray rapidly positions the articles in such a manner as to fill all, or practically all, of the recesses with properly positioned articles. The operator then rotates the hand wheel 24 to lower the forward end of the tray from the position illustrated in Fig. 1 so that the surplus articles are discharged into the hopper 34. The screen 39 is then placed upon the tray with the assembled articles therein, the backing-board 40 superimposed upon the screen and the tray, screen and backing-board lifted from the machine and inverted, thus depositing the articles in their assembled position upon the screen. The screen may then be removed from the tray and carried to a painting booth and paint sprayed upon the articles with an air brush, or the articles may be subjected to such other treatment as may be feasible. Thus the articles may be coated upon one side.

When the articles thus coated have become dried they are again dumped into the hopper 34 and reassembled upon the tray in the same manner. In order to invert the articles for the purpose of painting or coating the other side, a reversing tray is employed which preferably comprises a plate 42, of hard rubber, having recesses 43 therein which are complementary to the recesses 19 of the assembling tray, (see Fig. 9). After the articles have been assembled upon the tray 18 in the manner aforesaid the reversing tray 42 is placed upon the assembling tray and both trays lifted together from the machine and inverted, thereby depositing the articles in the reversing tray 42 as illustrated in Fig. 9. The screen 39 is thereupon placed upon the reversing tray with the backing-board 40 superimposed upon the screen. These members thus assembled are reversed leaving the articles in inverted position upon the screen 39 as illustrated in Fig. 11. The screen may then be removed from the backing-board 40 and sprayed with an air brush as illustrated in Fig. 12.

For convenience in the operation of the machine a plurality of shelves to receive the screens and trays when not in use are provided. In the construction illustrated in the drawings a shelf 44 is mounted upon the rearward extension of the upper side bars 3 and the rear posts 2, which are extended upwardly, also support shelves 45 and 46.

In the usual operation of the machine two operators are employed, one who stands in front of the machine to position the assembling tray upon the machine and deposit the articles thereupon and operate the machine, while the other operator attends to the removal of the trays from the machine and the transfer of the articles from the assembling tray to the screen, or from the assembling tray to the reversing tray and thence to the screen in the manner heretofore described.

In the usual operation of the machine the machine operator takes an assembling tray from the shelf 45 and places it in position so that the cross bar on the under side of the tray is engaged in the slot in the upper end of the oscillating arm or lever 9. He then starts the motor, thus causing a rapid reciprocation of the assembling tray. He then dips a hand-scoop into the stock of articles in the hopper 34 and deposits them at the upper rearward end of the assembling tray, the oscillation of which causes the articles to spread out and gradually to work down to the lower end of the tray where the surplus flows off and drops back into the hopper 34. The reciprocating operation of the tray is started with the eccentric 22 in its highest position illustrated in Fig. 1 so that the inclination of the assembling tray is only slight and the articles work down at a slow rate. When, after a few seconds, the recesses in the rear portion of the assembling tray are all, or nearly all, filled with articles, the hand wheel 24 is rotated rather quickly through an angle of one hundred eighty degrees, bringing the eccentric into its lowest position and the assembling tray to its maximum angle of inclination. This causes the surplus of articles on the surface of the tray to slide rapidly off into the hopper. Another half turn of the hand wheel 24 brings the assembling tray with its load of properly positioned articles up to the original position and the oscillation of the tray is stopped by switching off the electric motor. A screen is then taken from the shelf 44 and placed over the articles in the assembling tray. This screen fits closely within the flanges 37 and 38. A backing-board is then taken from the shelf 46 and placed on the top of the screen. This backing-board also fits closely in the side of the flanges and entirely covers the screen. The other operator, who stands at the side of the machine, then grasps the assembly with both hands, holding it in such a manner that the backing-board is pressed down upon the screen. He then lifts the assembly up out of the machine to about the height of his head, turns it over with a twist of the wrists and sets it down upon the upper shelf 46 with the backing board on the bottom. The backing board is stiff enough to keep the screen flat and hard up against all of the buttons in the tray so that none of them will slip out of their shallow depressions during this maneuver. He then removes the assembling tray, inverts it and places it upon the shelf 45. He then removes the screen with the articles properly positioned thereupon all facing in the same manner from the shelf 46 and places the same upon a suitable support, desirably in the form of a turntable (not shown) where it is sprayed by a third operator. When the screen is thus removed from the shelf 46 the backing-board resting upon the shelf is ready to be placed upon the next tray of buttons.

When it is desired to paint or coat the other sides of the articles the reversing tray is also used in the manner above described. This, however, requires two turnings of the articles to position their reverse faces upwardly upon the screen, whereas only one inversion is necessary when it is desired to coat the articles upon one face only.

Figure 13:
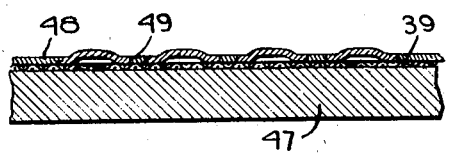

In Fig. 13 a modified form of tray construction is illustrated which may also be employed. This construction comprises a tray desirably in the form of a flat sheet of rubber 47, or other material, having suitable supporting girders (not shown) such as are illustrated in Fig. 1, but which presents a flat surface. The screen 39 is placed directly upon this tray and a supplemental tray 48 having juxtaposed apertures 49 therethrough, which closely fit the periphery of the articles, is superimposed upon the screen 39. The supplemental tray 49 in this case is of such thickness as to receive and retain the articles only when predetermined faces rest upon the screen, improperly positioned articles being thrown off of the screen during reciprocation of the tray in the manner heretofore described. In this construction, therefore, it is merely necessary to remove the supplemental tray after the articles have been assembled to leave the articles properly positioned upon the screen 39 for painting. When it is desired to invert the articles another screen and backing-board is placed upon the tray 39, the assembly inverted and the tray 47, screen 39 and supplemental tray 48 removed in the manner heretofore described, thus leaving the articles in inverted position upon the screen so that the opposite faces can be readily painted with an air brush, or otherwise treated.

It will be understood that the embodiment of the invention disclosed herein is of an illustrative character and is not restrictive and that other suitable mechanisms may be employed to perform the steps of the process herein described and claimed within the meaning and scope of the following claims.

Having thus described the invention, what is claimed as new, and desired to be secured by Letters Patent, is:

1. The process of preparing a group of articles for air brush painting which comprises assembling the articles in separate but juxtaposed positions upon an assembling tray, superimposing a screen upon the assembled articles, inverting the tray and screen to transfer the articles to the screen and removing the tray.

2. The process of air brush painting buttons and like articles which present opposite faces of differing contours, which comprises placing the articles in juxtaposed separate recesses in an assembling tray, superimposing a screen upon the assembled articles, inverting the tray and screen to transfer the articles to the screen, removing the tray from the screen and applying paint by an air brush to the exposed faces of the article.

3. The process of air brush painting buttons and like articles which present opposite faces of differing contours, which comprises placing the articles in juxtaposed, separate recesses in an assembling tray, superimposing a screen upon the assembled articles, inverting the tray and screen to transfer the articles to the screen, removing the tray from the screen and applying paint by an air brush to the exposed faces of the article, subsequently reassembling the partially painted articles upon the tray in the same manner, superimposing upon the assembling tray a reversing tray having recesses complementary to the opposite faces of the articles, inverting the assembling and reversing trays, then placing a screen upon the buttons in the recesses in the reversing tray, again inverting the reversing tray and applying paint by an air brush to the reversed faces of the article.

4. The process of air brush painting a group of like articles which present opposite faces of differing contours which comprises placing a mass of said articles upon a slightly inclined reciprocating assembling tray having juxtaposed recesses to receive and retain the articles when predetermined faces are introduced into the recesses, progressively discharging the remainder of the mass of articles from said tray, superimposing a screen upon the articles assembled in the recesses of the tray, inverting the tray and screen to transfer the articles to the screen, removing the assembling tray from the screen and applying paint by an air brush to the exposed faces of the articles.

5. The process of air brush painting a group of like articles which present opposite faces of differing contours which comprises placing a mass of said articles upon a slightly inclined reciprocating assembling tray having juxtaposed recesses to receive and retain the articles when predetermined faces are introduced into the recesses, more steeply inclining the tray when the recesses have been substantially filled with said articles to discharge the remainder of the mass of articles therefrom, superimposing a screen upon the articles assembled in the recesses of the tray, inverting the tray and screen to transfer the articles to the screen, removing the assembling tray from the screen and applying paint by an air brush to the exposed faces of the articles.

In testimony whereof, I have signed my name to this specification.

FORREST G. PURINTON.